United States Patent [19]
Yokote et al.

[11] Patent Number: 5,178,815
[45] Date of Patent: Jan. 12, 1993

[54] METHOD OF FORMING COMPOSITE MOLDINGS

[75] Inventors: Sachio Yokote; Kenji Yokogi; Masaki Misumi, all of Kanagawa, Japan

[73] Assignees: Mitsui Toatsu Chemicals, Inc., Tokyo; Shimizu Seiko Kabushiki Gaisha, Saitama, both of Japan

[21] Appl. No.: 668,246

[22] Filed: Mar. 12, 1991

[30] Foreign Application Priority Data

| Mar. 15, 1990 | [JP] | Japan | 2-62760 |
| Jun. 5, 1990 | [JP] | Japan | 2-145326 |
| Jun. 5, 1990 | [JP] | Japan | 2-145327 |

[51] Int. Cl.$^5$ .................. B29C 45/14; B29C 45/56
[52] U.S. Cl. .................. 264/259; 264/46.4; 264/328.1; 264/328.12; 425/127; 425/129.1
[58] Field of Search ............ 264/259, 266, 328.1, 264/328.11, 328.7, 310, 328.12, 275, 46.4, 46.6, 511, 251; 425/127, 129.1

[56] References Cited

U.S. PATENT DOCUMENTS 4,020,138  4/1977  Nettesheim et al. ............. 264/135

FOREIGN PATENT DOCUMENTS

| 333198A2 | 9/1989 | European Pat. Off. | 264/266 |
| 1210977 | 2/1966 | Fed. Rep. of Germany . | |
| 2329434 | 10/1976 | France . | |
| 55-109659 | 8/1980 | Japan | 264/266 |
| 61-58705 | 3/1986 | Japan | 264/46.4 |
| 61-209138 | 9/1986 | Japan | 264/259 |

Primary Examiner—Jan H. Silbaugh
Assistant Examiner—Angela Y. Ortiz
Attorney, Agent, or Firm—Burns, Doane, Swecker & Mathis

[57] ABSTRACT

A method of manufacturing composite moldings by executing the following steps (a) to (f) by using an injection molding machine provided with a fixed die having a gate which is opened to a cavity forming surface and a movable die which can come into contact with and out of contact with the fixed die:

(a) step of setting a desired skin material to a predetermined position of the movable die in a state in which the movable die is sufficiently removed from the fixed die;
(b) a first die clamping step in which the movable die is moved toward the fixed die and is stopped at a position where an interval between the movable and fixed dies is equal to a predetermined value of 5 mm or more;
(c) step of injecting a fused resin into a cavity;
(d) a second die clamping step in which the movable die is stopped at a desired last position;
(e) step of cooling for a predetermined time after the second die clamping step;
(f) step of removing the movable die from the fixed die and opening the dies and taking out a product.

3 Claims, 4 Drawing Sheets

METHOD OF FORMING COMPOSITE MOLDINGS

BACKGROUND OF THE INVENTION

1. Field of the Invention

The present invention relates to a method of manufacturing composite moldings which are formed by adhering a desired skin material onto the surface of a plastic base material in order to give a decoration and a special function to composite moldings and to a die which is particularly recommended to carry out the method.

2. Description of the Related Art

Composite moldings can be exemplified by interior materials of automobiles or the like. Those composite moldings are ordinarily manufactured by adhering a skin material such as PVC leather, carpet, or the like having an advanced decoration performance onto a plastic molded article as a base material by using an adhesive agent.

However, the above manufacturing method, requires much labor to adhere the skin material. Thus, there are problems such that designs are limited, the defect rate of products is high and manufacturing costs are high.

Therefore, there has also been proposed a method wherein a special stamping molding machine is used, a skin material is previously adhered on the inner surface of a die, and after that, a fused resin is injected into the die, and the die is clamped, thereby obtaining composite moldings covered with the skin material.

However, in such a kind of conventional well-known stamping molding machine, simultaneously with the start of the injection of the fused resin, contact of a part of the resin with the skin material is immediately started. However, the skin material is completely covered by the resin at the time of the completion of the die clamping. Therefore, the contact time between the resin and the skin material changes depending on the portion on the skin material and the temperature of the resin upon contacting also varies depending on a location. Consequently, there is a problem such that in the case of particularly, obtaining large moldings, uniform moldings cannot be obtained.

More particularly, near a resin injection gate, the injected high temperature resin directly collides and comes into contact with the surface of the skin material at a high pressure. However, in a portion away from the gate, when the die clamping is performed, the resin comes into contact with the skin material at relatively low temperature and low pressure.

Therefore, thicknesses or densities of composite moldings are uneven and exhibit wrinkles, a variation of brilliance, or the like on the surface, so that composite moldings of a good quality are not obtained.

To solve the above problems, there has been proposed a stamping molding machine which executes the molding after a fused resin is almost uniformly injected and coated onto the surface of a skin material. However, the above machine has problems in that it is expensive, has a long molding cycle and resins which can be used are limited. In addition, the problem that the temperature of the resin upon molding is uneven is not completely solved.

OBJECTS AND SUMMARY OF THE INVENTION

The present invention is made to solve the above problems and it is an object of the invention to provide a method suitable for obtaining large composite moldings as mentioned above by using an inexpensive general injection molding machine without needing a special stamping molding machine, a die which is recommended to embody such a method, and a method of manufacturing composite moldings of a high grade by using such a die.

More particularly, it is another object of the invention to provide a novel manufacturing method such that when large composite moldings are manufactured by using an inexpensive general injection molding machine as mentioned above, a fused resin can be come into contact with a skin material in a lump within the shortest time under the same conditions as possible and moldings having a uniform quality as a whole can be obtained.

The above objects are accomplished by an arrangement in such a manner that an injected resin is directly prevented from coming into contact with the skin material adhered onto a movable die for a period of time when a fused resin is injected into the die, and the resin is contacted with the skin material in a lump when the die is clamped.

In an embodiment, the die closing operation of the movable die is executed in two steps. The die is mounted in a position which is inclined from a vertical position and the motion of the movable die is controlled among a full opening position where a molded article is taken out and a next skin material is adhered onto the molded article, an intermediate position where the die is held for a period of time when the resin is injected, and a full closed position where the complete die clamping molding is executed. That is, the movable die is controlled at three positions and between them.

Although the fused resin is injected during a period of time when the movable die is located at the intermediate position, the movable die is removed to a position which is away from the fixed die by a predetermined distance or more so that the skin material adhered on the surface of the movable die does not come into contact with the fused resin which is injected. After completion of the resin injection, the movable die is moved to the full closed position and the die clamping and molding are executed.

Still another object of the invention is to provide a die suitable for manufacturing large molded articles.

That is, a novel die is provided to further ensure the accomplishment of the above objects of the invention.

Movable weir members are provided in the die. The movable weir members temporarily intercept the fused resin which is injected into a space between the fixed die and the movable die and allow the fused resin to be adhered onto the surface of the fixed die, thereby blocking the fused resin from coming into premature contact with the skin material. When the die is clamped, the resin is pushed and widened from a lump to the entire surface of the skin material and thus comes into contact therewith.

Further specifically speaking, the movable weir members are movably attached to the fixed die and are reciprocated between the intercepting position where the movable weir members are projected into a cavity which is formed between the fixed and movable dies and transverse a passage of the resin which is injected from the gate at a position very close in distance from the opening of the gate and the backward position where the movable weir members are moved backward from the cavity and parts of the sufaces of the members substantially form a part of the surface of the die. Further, the movable weir members are reciprocated between the intercepting position and the backward position synchronously with the die clamping motion.

The movable weir members are constructed so as to execute a straight motion, a rotational motion, and composite motions relative to the fixed die. At one of the terminal ends of the motion of the members, a jet stream of the resin which is injected from the gate is intercepted, thereby allowing the resin to be adhered and remain on the resin molding surface of the fixed die. At the other terminal end, the movable weir members are moved backward to such a position so as not to obstruct the clamping motion of the die and the resin molding.

The moving path between the intercepting position and the backward position can be a path comprising a straight motion, a parallel movement, a swing motion, and any combination thereof.

Further, in order to prevent the fused resin adhering on the surface of the fixed die from rapidly flowing downward, it is recommended to form proper concave and convex portions, grooves, movable projections, and the like onto the surface of the fixed die to which the resin is to be adhered or to make a part of such an adhering surface as a movable surface which can swing.

By constructing the die as mentioned above, even if a general injection molding apparatus is used without using a special stamping molding apparatus, the fused resin can uniformly come into contact with the skin material at a low pressure within the shortest time. Thus, composite moldings of a high quality can be inexpensively easily produced.

On the other hand, according to the invention, even if a skin material which is relatively easily influenced by the heat is used, uniform composite articles can be obtained. In addition, it is also possible to create a composite article having a special pattern obtained by the affect of heat.

In an invention as mentioned above, since the ordinary injection molding machine may be used, a great amount of equipment investment to install a special machine is unnecessary.

On the other hand, the opening/closing timing of the die of the ordinary injection molding machine are controlled. That is, the die clamping operation is once stopped before the dies are completely clamped, the fused resin is injected and molded at this time, and the dies are clamped with a predeterminded pressure after that. Therefore, the die clamping molding at a low pressure can be performed and, accordingly, the skin material may be adhered onto base plastics without losing the surface decoration performance and function.

Further, according to the invention, the surface of the die on which a cavity forming concave portion is formed is inclined within a range from 15° to 75° from the horizontal surface and obstacles such as projections, grooves, or the like are formed on the surface of the die on which the resin flows down. Thus, it is possible to prevent the fused resin which is injected into the die from flowing out of the die due to gravity.

Any thermoplastic resin can be used as the resin which is used in the invention.

A foaming resin can be also used as the resin serving as a base plate for the purpose of a light weight. In this case, as foaming agents, for instance, there can be used dinitrosopentamethylenetetramine or tetranitroso-trimethylenetetramine of the nitroso series compounds, p, p'-oxybisbenzensulfonylhydrazide of the hydrazide series compounds, p,p'-oxy-bisbenzonylsemicarbazide of the sulfonylsemicarbazide series compounds, azodicarbonamide or barium azodicarboxylate of the azo-compounds series, and a mixture of an acid such as carbonate and oxalic acid or the like.

On the other hand, a gas such as carbon dioxide, water vapor, nitrogen, air, freon, or the like may be injected into the injection molding machine and may be mixed into the fused resin and the fused resin can be also expanded when it is injected into the die.

Added amounts of those foaming agents and gas may be properly determined in accordance with the required expansion ratio.

BRIEF DESCRIPTION OF THE DRAWINGS

FIG. 1 is a cross sectional view showing a state in which the movable die is removed from the fixed die and a skin material is adhered onto the surface of the movable die;

FIG. 2 is a cross sectional view showing a state in which the movable die is moved to an intermediate position;

FIG. 3 is a cross sectional view showing a state in which a proper amount of resin is injected in the state shown in FIG. 2 and is adhered and held onto the resin molding surface of the fixed die;

FIG. 4 is a cross sectional view showing a state when a die clamping and cooling operations are executed;

FIG. 5 is a cross sectional view showing a state in which the movable die is removed from the fixed die and a skin material is adhered onto the surface of the movable die;

FIG. 6 is a cross sectional view showing a state in which a proper amount of resin is injected in a state in which movable weir members are projected to the intercepting position, and then the resin is adhered and held on the resin molding surface of the fixed die;

FIG. 7 is a cross sectional view showing a state in which the movable weir members are pulled into the backward position; and FIG. 8 is a cross sectional view showing a state when the die clamping and cooling operations are executed.

DESCRIPTION OF THE PREFERRED EMBODIMENTS

Figure 1:
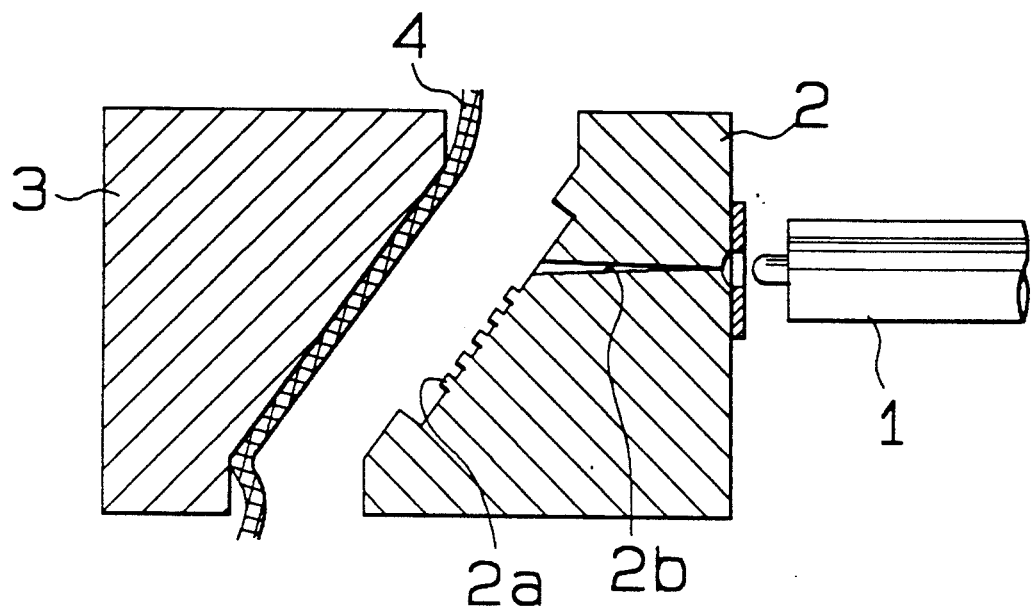
FIGS. 1 to 4 are cross sectional views showing relative positions between a fixed die and a movable die in working steps in the case of embodying a method of the invention by using a well-known horizontal injection molding machine.

The present invention will be more specifically described hereinbelow with reference to the drawings.

In FIGS. 1 to 4, reference numeral 1 denotes a resin injection cylinder of an injection molding machine; 2 a fixed die; 3 a movable die; 4 a skin material; and 5 a fused resin.

Mating surfaces of the movable die 3 and the fixed die 2 inclined at a predetermined angle Θ within a range form 15° to 75° from the horizontal surface.

On the surface of the fixed die 2, it is recommended that approprite concave and convex portions are formed in the portion where the injected fused resin remains on the lower side of a gate 2b in order to block the downward flow of the resin as shown in the drawings.

The opening and closing operations of the die are executed in a manner similar to the ordinary injection molding steps. First, as shown in FIG. 1, in a state in which the movable die 3 is sufficiently removed from the fixed die 2, a predetermined skin material 5 is located to a predetermined position of the movable die 3.

Figure 2:
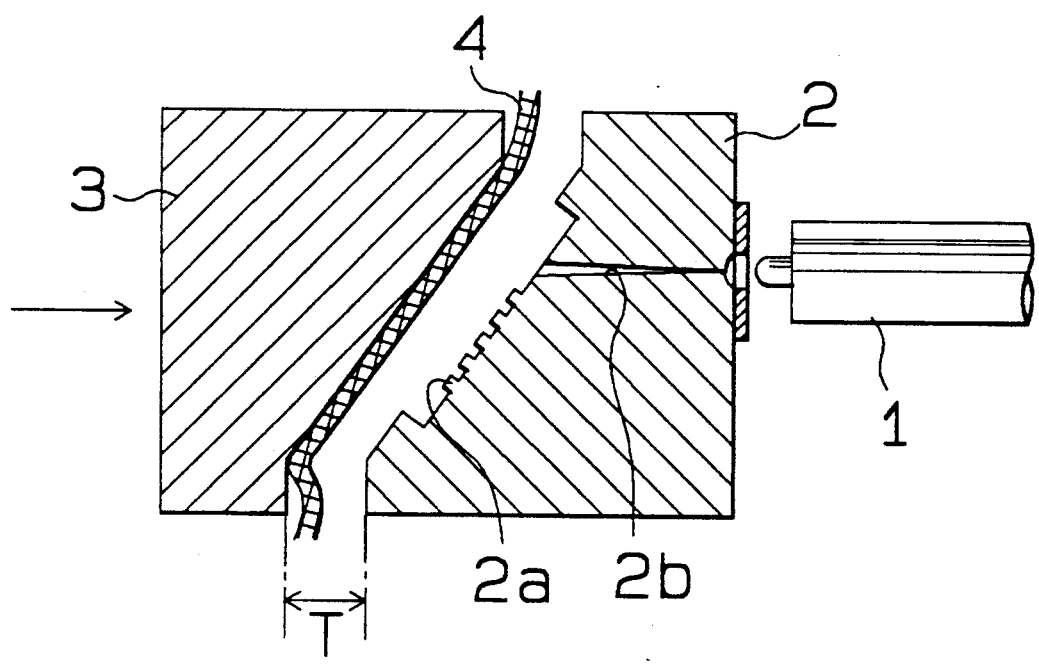

Then, as shown in FIG. 2, the movable die 3 is moved toward the fixed die 2 and the die clamping at the first stage is executed.

In the die clamping at the first stage, the movement of the movable die is temporarily stopped at a stage in which the movable die 3 is moved to a position where a distance T between the movable die 3 and the fixed die 2 is equal to a proper value which is at least about 1.5 times or more as large as the thickness of the base material plastic layer of the composite moldings to be manufactured, ordinarily, a value of 5 mm or more.

Figure 3:
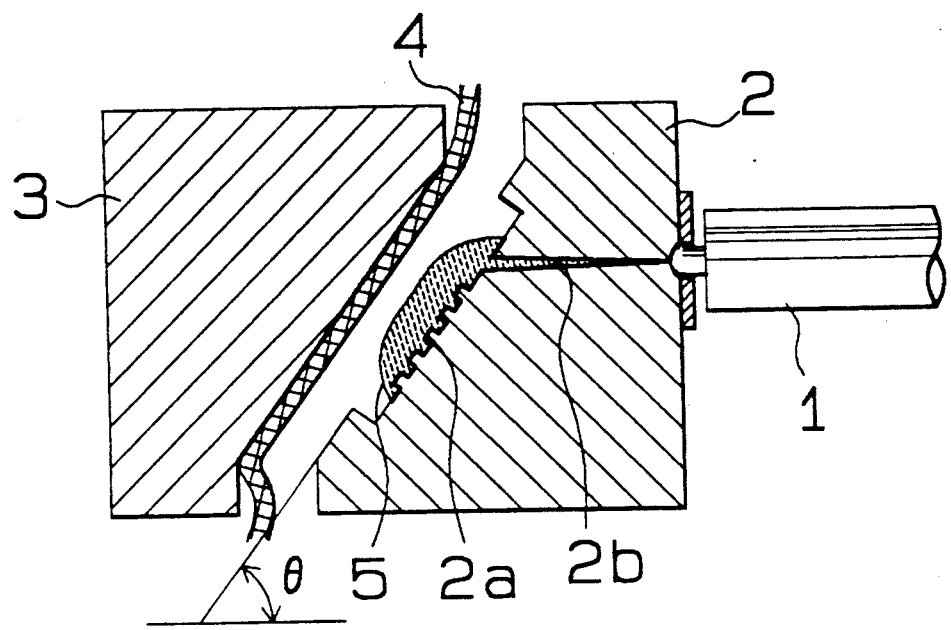

After the die clamping at the first stage is temporarily stopped, as shown in FIG. 3, the fused resin 5 is injected from the injection molding machine 1 into a cavity forming concave portion 2a of the fixed die 2.

In this case, a shape, a position, and the like of the gate 2b can be similarly set to those in the ordinary injection molding die. One or a plurality of gates are formed at predetermined positions depending on the shape and size of the article.

Figure 4:
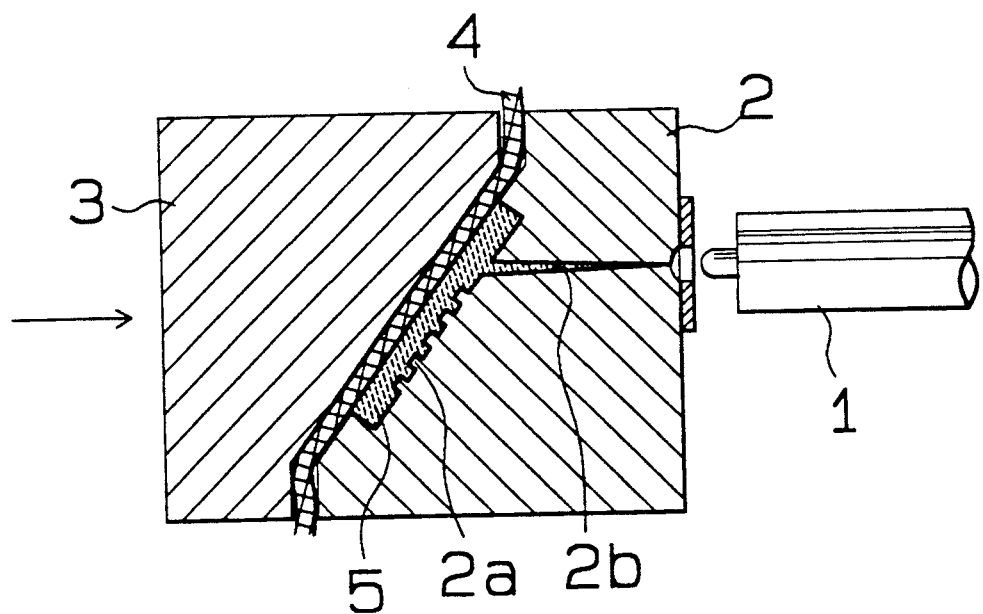

Since the mating surfaces of the movable die 3 and the fixed die 2 are inclined at a predetermined angle Θ within a range from 15° to 75° from the horizontal surface, the fused resin 5 which is injected into the die doesn't flow from the die surface and slowly flows down the die surface. After completion of the resin injection, as shown in FIG. 4, the movable die 3 is promptly again moved toward the fixed die 2 and the die clamping at the second stage is started.

It is desirable to perform the die clamping at the second stage at a low pressure as possible. For this purpose, a die clamping speed is set to a value within such a range so as not to harm a flow of the fused resin 5 into the entire die and in consideration of decoration performance and as a function of the skin material 4.

Since the conventional injection molding machine injects the fused resin into the die at a high pressure after completion of the die clamping, it is necessary to perform a high pressure die clamping. Therefore, the angle Θ of the mating surfaces of the movable die 3 and the fixed die 2 have to be set to be vertical in consideration of an efficiency of the clamping force. However, according to the method of the invention, since the die clamping is executed at a low pressure, the mating surfaces can be inclined.

After the die clamping was performed as mentioned above, the resin is cooled in a clamped state for a predetermined time and, after that, the dies are opened and the product is taken out.

In FIGS. 5 to 8, reference numeral 11 denotes a cylinder of an injection molding machine; 12 a fixed die; 13 a movable die; 14 a hydraulic cylinder; 15 movable weir members; 16 links; 17 jagged member attached on the surface of the fixed die 12; 18 a skin material; and 19 a fused resin.

Figure 5:
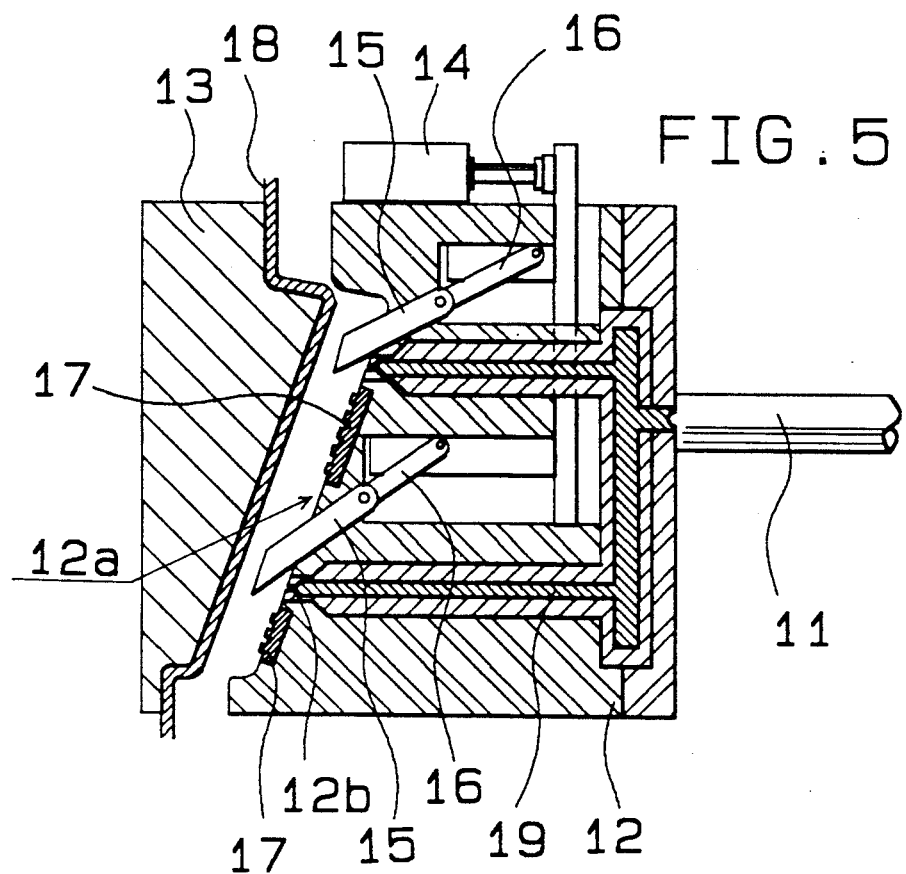
FIGS. 5 to 8 are cross sectional views showing states of each section of the die in the respective steps when a molded article is obtained by using the die according to the invention.
Figure 6:
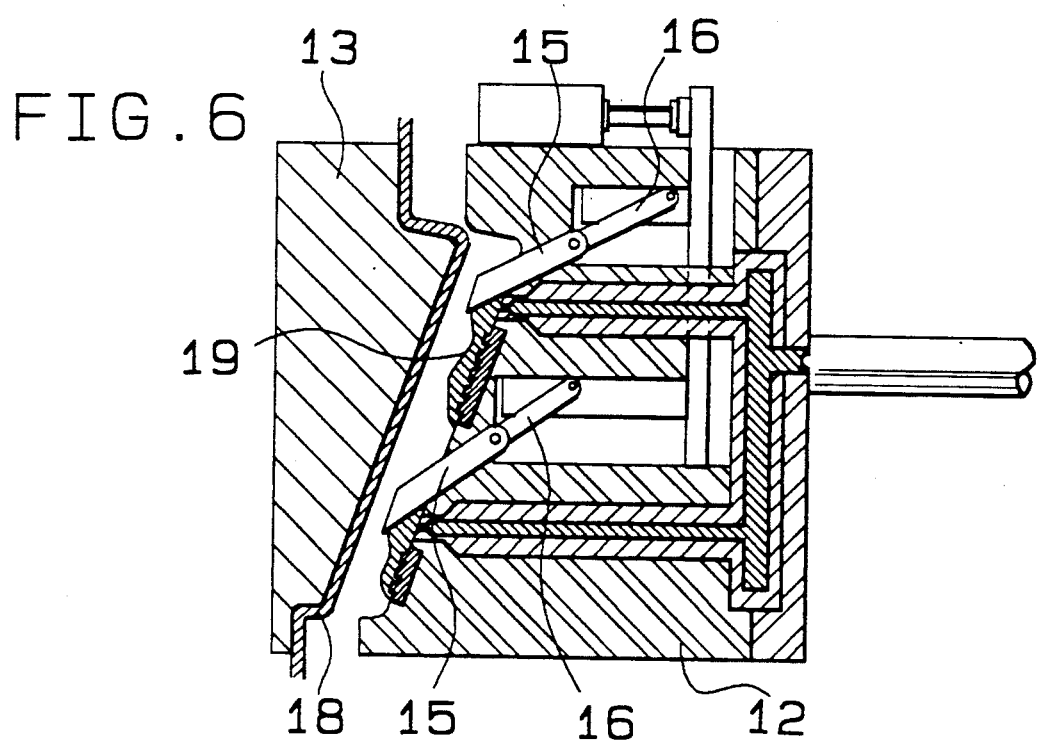
Figure 7:
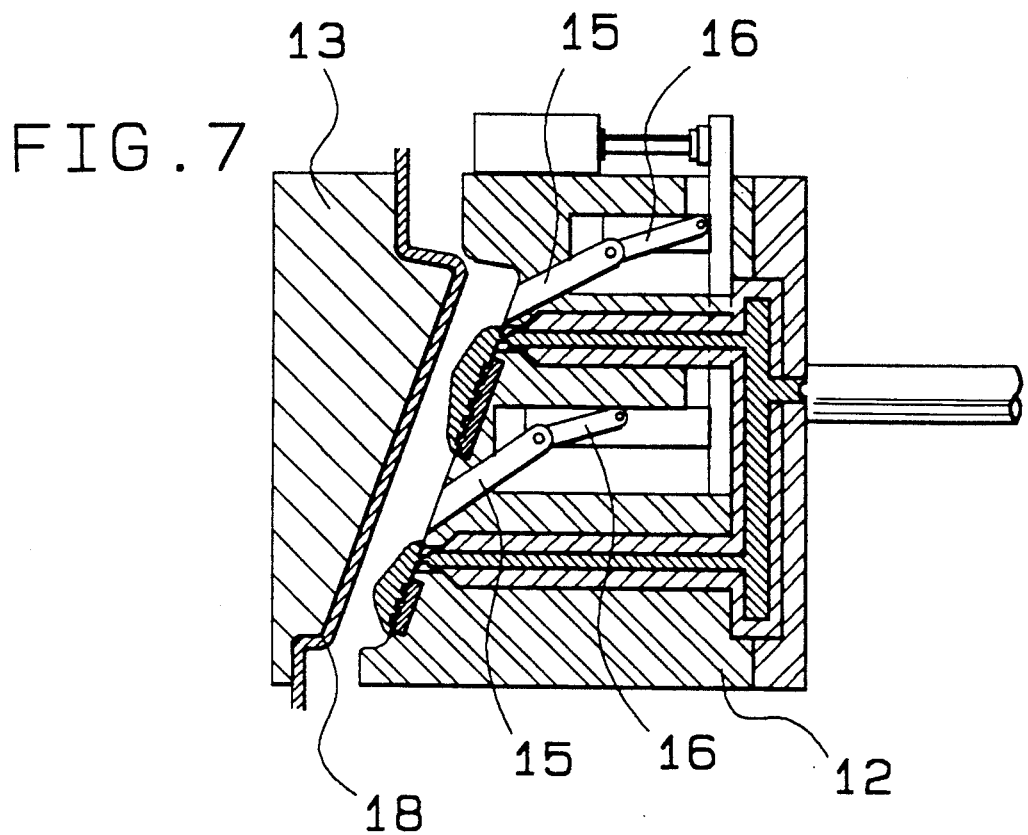
Figure 8:
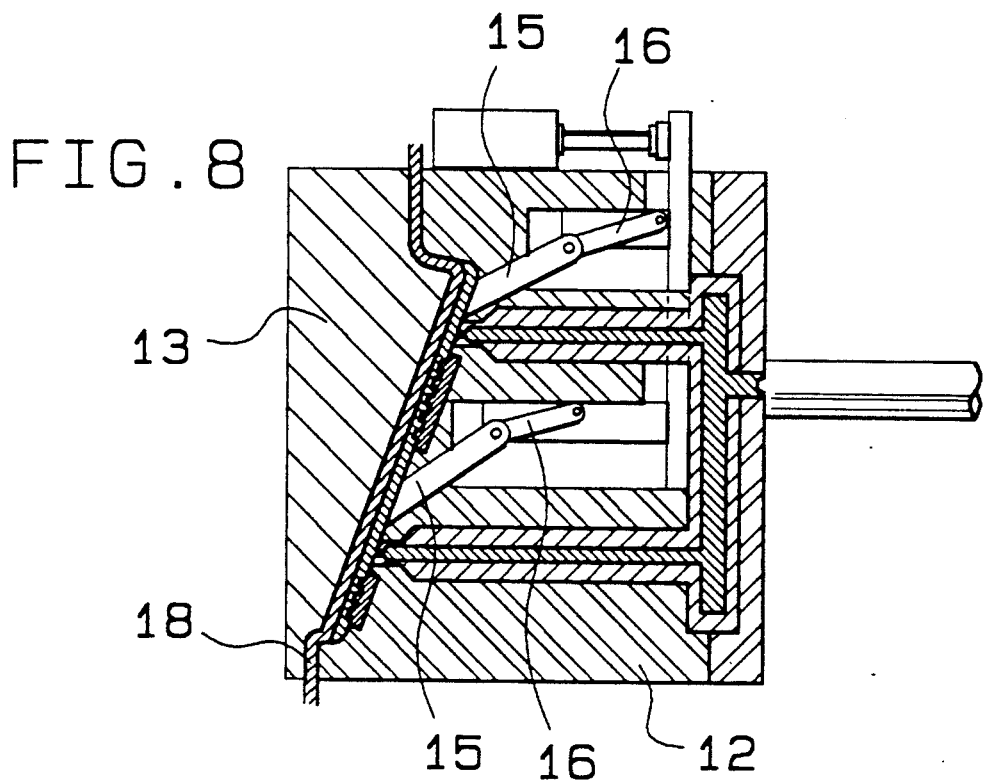

The movable weir members 15 are forwardly and backwardly movably held in guide holes formed at positions in the fixed die 12 which are close to the gate. The members 15 are coupled to rods of the hydraulic cylinder 14 through the links 16. The movable weir members 15 can reciprocate between the intercepting position where the front edge portions are projected into a resin molding space 12a toward the movable die and transverse the path of the fused resin which is injected from the gate as shown in FIGS. 5 and 6 and the backward position where the whole portions of the members are moved backward from the resin molding space and the front edge surfaces substantially form a part of the surface of the fixed die as shown in FIGS. 7 and 8.

When the movable weir members 15 are located at the intercepting position, the fused resin which is injected from the gate is blocked by the movable weir members 15 and is adhered and held onto the resin molding surface of the fixed die 12, so that the resin does not directly come into contact with the skin material.

The opening and closing operations of the die are similar to those in the ordinary injection molding steps. As shown in FIG. 5, in a state in which the movable die 13 is sufficiently removed from the fixed die 12, the predetermined skin material 18 is adhered to a predetermined portion of the movable die 13. After that, the movable weir members 15 are projected to the front surface of the gate opening and a predetermined quantity of fused resin 19 is injected in such a state.

The injected fused resin 19 collides with the front edge portions of the movable weir members 15 and is blocked, so that its speed and pressure are remarkably reduced and the fuxed resin is adhered onto the resin molding surface of the fixed die. The resin flows downward along the die surface and slowly flows down in a block-like shape.

In this case, if the jagged members 17 having a number of projections are attached on the resin adhering surface of the fixed die 12, the flowing speed of the fused resin further decreases and the resin remains in this portion.

The jagged member 17 are fixed in the embodiment. However, they can be attached so as to be inclined or can be constructed so that only the convex portions can be protruded from or drawn into the resin molding surface.

On the other hand, in order to prevent the fused resin from flowing from the fixed die and to hanging down toward the skin material, it is desirable to incline the main section of the resin molding surface of the fixed die 12 instead of arranging it in the vertical direction. For this purpose, the die mating surfaces may be inclined depending on the shape of die.

On the other hand, if it is undesirable to incline the entire die because of reasons such that the die is large, it is recommended that at least only the resin adhering surface may be set to a single or zigzag inclined surface or may be constructed as a movable surface which can partially swing.

After the fused resin 19 is injected, as shown in FIGS. 7 and 8, the movable weir members 15 which block the fused resin are moved backward to the backward position, the movable die 13 is moved forward to close the dies, the die is opened after the resin is cooled for a predetermined time, and a product is taken out.

The construction of the invention is not limited to the above embodiment but can be applied to molding machines other than the injection molding machine, for instance, an extruder or other various molding machines. There is no limitation in the shape of die and the like. The fixed die can be used as a core and the movable die can be used a cavity. The shape of the movable weir member can be set to any one of the hinge type, rotary type, swing type, and composite moving type. As an actuator to control the position, in addition to the apparatus comprising the link and the hydraulic cylinder as mentioned above, it is possible to use a direct driving system by various cylinders or an electromagnetic solenoid, a linear motor, or the like, a system by screws and a motor, or the like. It is also recommended to link the weir members with the opening/closing motion of the die. The arrangement, the number, and the like of the movable weir members can also be modified if required. Further, the resin flowing path can be also be curved near the exit of the injection gate of the resin. The present invention includes all of the embodiments and modifications which can easily be thought of by the person with the ordinary skill in the art from the above description within the range of the objects of the invention.

The invention provides a method of forming composite moldings comprising a skin material and a resin layer by using a fixed die 12 having the gate to inject the fused resin into the resin molding space and the movable die 13 which is arranged so as to come into contact with and be removed from the fixed die, wherein the fixed die 12 has the movable weir members 15 which can be reciprocated between the intercepting position where the members 15 are projected into the resin molding space and prevent passage of the resin injected from the gate 12b into the molding space at a position of a close distance from the opening of the gate 12b and the backward position where the members 15 are moved backward from the resin molding space and parts of the surfaces of the members 15 substantially form a part of the die surface, and the driving apparatuses 14 and 16 for reciprocating the movable weir members 15 between the intercepting position and the backward position, and wherein the fixed die 12 is attached to the general injection molding machine together with the movable die 13, and the following steps are executed.

(a) step of setting the desired skin material 18 to a predetermined position on the movable die 13 in a state in which the movable die 13 is sufficiently removed from the fixed die 12;

(b) step of moving the movable weir members 15 to the intercepting position;

(c) step of injecting the fused resin from the gate, intercepting the fused resin by the movable weir members 15, and adhering and holding the fused resin to the resin molding surface of the fixed die 12;

(d) step of moving the movable weir members 15 to the backward position;

(e) step of moving the movable die 13 toward the fixed die 12 and executing the die clamping;

(f) step of cooling for a predetermined time in a die closed state; and (g) step of removing the movable die 13 from the fixed die 12 and taking out the product.

The above steps are not always sequentially executed. For instance, step (b) can be performed prior to step (a). It is desirable to simultaneously execute steps (a), (c) and steps (c), (d) in parallel. It is sufficient to complete step (a) at any time point before step (e) is completed.

The method of the invention is not limited to the above embodiment but can be also applied to molding machines other than the injection molding machine, for instance, an extruder or other various molding machines. The shape of die and the like are not limited. The fixed die can be a core and the movable die can be a cavity. The shape of the movable weir member can be selected from any one of the hinge type, rotary type, swing type, and composite moving type. As an actuator to control the position, in addition to the system comprising the link and the hydraulic cylinder as mentioned above, it is possible to use a direct driving system by various cylinders or an electromagnetic solenoid, a linear motor, or the like, a system by screws and a motor, or the like. It is also recommended to link with the opening/closing motion of the die. The arrangement, the number, and the like of the movable weir members can be modified in accordance with necessity. Further, the resin flowing path can be also curved near the exit of the injection gate of the resin. The present invention includes all of the embodiments and modifications which can easily be thought by the person with the ordinary skill in the art from the above description within the objects of the invention.

Since the invention has been constructed as mentioned above, according to the invention, the contact between the fused resin and the skin material is started and completed within an extremely short time when the die clamping is performed, so that uniform contact at a low pressure is realized for the entire surface. Thus, the composite moldings of a uniform quality are obtained.

We claim:

1. A method of manufacturing composite moldings utilizing a fixed die provided with a cavity having a cavity molding surface inclined 15° to 75° from horizontal, a gate opening to said cavity and installed with a weir member movable between a stemming position protruding in front of said gate opening and a position withdrawn from the cavity, said method further utilizing a movable die which is joinable with and separable from said fixed die, said method comprising:

(a) setting a skin material to a predetermined position on the movable die when the movable die is separated from the fixed die;

(b) moving the movable die toward the fixed die and stopping the movable die at a position where the distance between the movable die and fixed die is a predetermined value of 5 mm or more;

(c) injecting resin through the gate opening into the cavity wherein the movable weir member protrudes into the cavity in front of the gate opening and contacts and decelerates the resin in the cavity so that the resin flows along the cavity molding surface; then (d) withdrawing the movable weir member from the cavity;

(e) moving the movable die so as to join the movable die and fixed die together to close the dies and form the resin against the skin material;

(f) cooling the resin for a predetermined period of time to form the composite molding; and (g) separating the movable die and the fixed die and removing the composite molding.

2. The method of claim 1 wherein the fixed die includes a direct gate.

3. The method of claim 1 wherein the fixed die includes a plurality of gate openings with a movable weir member positionable in front of each opening.

* * * * *